(12) United States Patent
Kuttan et al.

(10) Patent No.: US 7,620,854 B2
(45) Date of Patent: Nov. 17, 2009

(54) METHOD AND SYSTEM FOR HANDLING INPUT/OUTPUT (I/O) ERRORS

(75) Inventors: Harish Kuttan, Bengalooru (IN); Harish S. Babu, Cupertino, CA (US); Gunneswara Marripudi, Santa Clara, CA (US); Roy M Paul, Bengalooru (IN); Anand Ananthabhotla, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 395 days.

(21) Appl. No.: 11/668,489

(22) Filed: Jan. 30, 2007

(65) Prior Publication Data

US 2008/0184077 A1 Jul. 31, 2008

(51) Int. Cl.
*G06F 11/00* (2006.01)
(52) U.S. Cl. ........................................ 714/43
(58) Field of Classification Search ............... 714/2–4, 714/7, 8, 13, 15, 16, 18, 25, 29, 43, 56
See application file for complete search history.

(56) References Cited

U.S. PATENT DOCUMENTS

| | | | | |
|---|---|---|---|---|
| 5,978,938 A | * | 11/1999 | Kaiser et al. | 714/48 |
| 6,625,761 B1 | * | 9/2003 | Sartore et al. | 714/43 |
| 7,428,602 B2 | * | 9/2008 | Vageline et al. | 710/8 |
| 7,447,934 B2 | * | 11/2008 | Dasari et al. | 714/5 |
| 2007/0061634 A1 | * | 3/2007 | Marisetty et al. | 714/48 |
| 2007/0174496 A1 | * | 7/2007 | Vageline et al. | 710/8 |

* cited by examiner

*Primary Examiner*—Nadeem Iqbal

(57) ABSTRACT

A method and system for handling errors on an Input/Output (I/O) link of a system is provided. The link is being shared by a plurality of devices of the system; each device may be shared by one or more operating systems. The method of error handling during configure of the system includes steps of checking a device for an error during configuration of the system and restricting the device from being configured, if an error is detected. The method includes the steps of examining the device capabilities to recover from errors, and; configuring the device in a first mode if the device has capabilities to recover from errors, else configuring the device in a second mode or not configuring the device. Further the handling of error may also be performed during runtime of the system, for doing so the step of checking is followed by a step of isolating and deleting the device if value of a number indicative of errors encountered for the device is greater than a threshold value. Else the method provides step of initiating a recovery process for the device and reporting result of the recovery process.

21 Claims, 5 Drawing Sheets

METHOD AND SYSTEM FOR HANDLING INPUT/OUTPUT (I/O) ERRORS

BACKGROUND OF THE INVENTION

An I/O link (interconnect) is a link that connects I/O devices to a host system. The I/O link can be shared by several hardware and/or software modules either within an operating system or across multiple operating systems. An I/O error on such shared link may impact the modules sharing that link. An error may be introduced during configuration of the host system or during run time of the host system. If there is a malfunctioning I/O device or if an I/O device and/or a software module controlling the devices/system do not have capability to handle I/O errors then it may become critical to handle I/O error to avoid malfunctioning of the host system. An error introduced by any of the I/O device on the I/O link may be critical enough to cause a host system crash.

BRIEF DESCRIPTION OF THE DRAWINGS

Embodiments of the invention will now be described, by way of example only, with reference to the accompanying drawings in which.

DETAIL DESCRIPTION OF THE SUBJECT MATTER

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
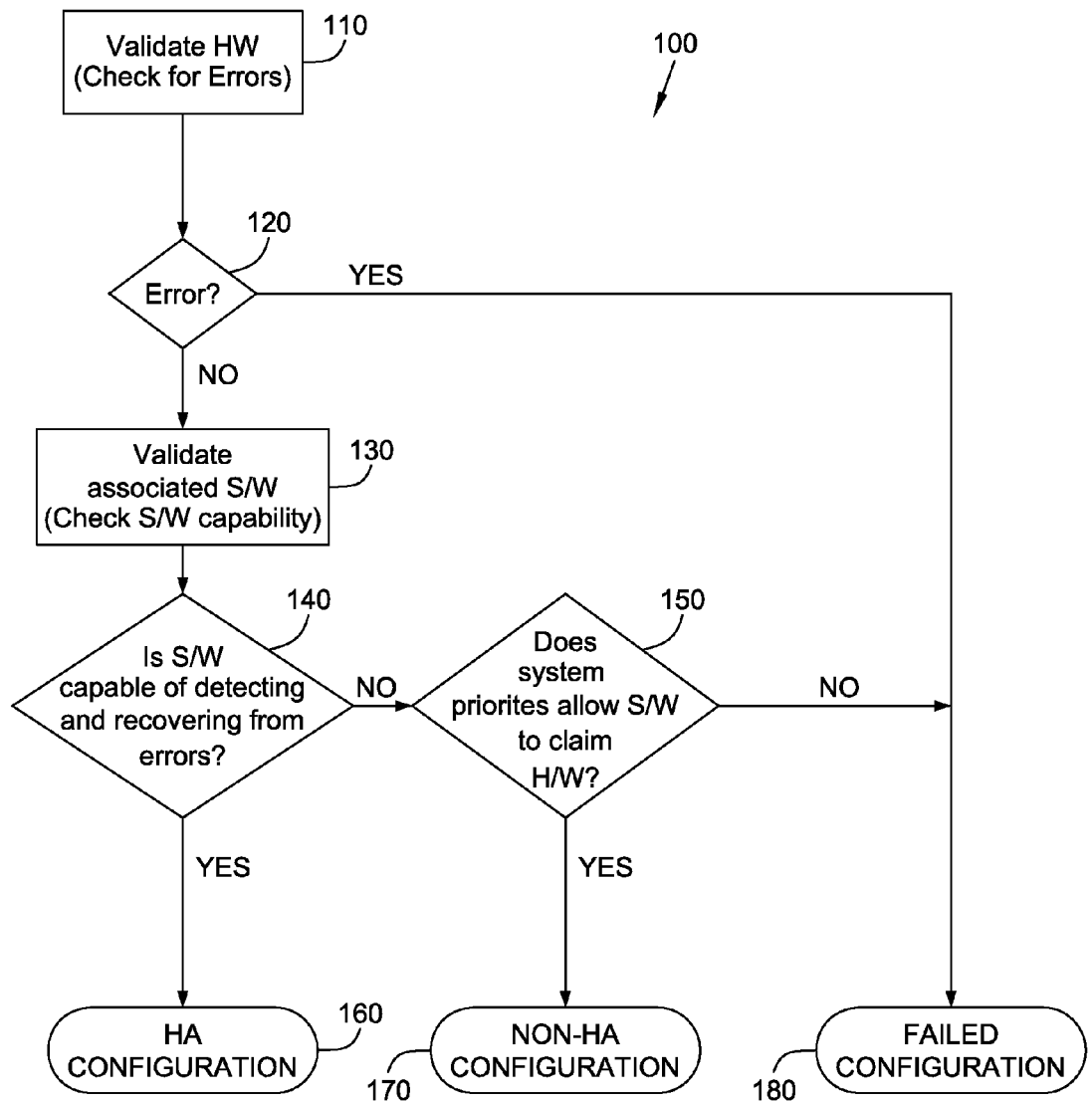
FIG. 1 is a flowchart illustrating a method for handling I/O errors during configuration of a system according to an embodiment of the present subject matter.

FIG. 1 shows a flowchart 100 illustrating a method for handling parity errors on a shared I/O link of a system during configuration of the system according to an embodiment of the present subject matter. The I/O link is being shared by a plurality of I/O devices. According to the method at step 110 while configuration of the system is in process, a device is checked for an error. At step 120, it is determined whether the device has any error and the device is not configured (step 180), if an error is encountered at step 120 and the step 110 of checking in repeated for another device. If no error is encountered at step 120, then at step 130 a software code of the device is validated. Validating the software code ensures that the device is not malfunctioning. The step of validation includes the step of determining, the system capabilities to handle and communicate with the I/O device. At step 140, the device is examined for the capabilities for recovering from errors. If the device has the capabilities then at step 160, the device is configured in a first mode. The first mode is identified as a High Availability (HA) mode. If result of the examination at step 140 provides that the device does not have the capabilities, then at step 150 the system priorities are checked and if the system priority shows that the device is a desirable device then the device is configured (step 170) in a second mode, the second mode is identified as a non-High Availability (Non-HA) mode. Else the device is not configured (step 180). While performing configuration step an identifier may be supplied to the device, which identifier may be an indicative of the mode of configuration. Above steps are repeated for each device on the link and for each link in the system.

This method achieves validation of the hardware, associated software and their capabilities of recovering from error/s during the configuration of a device. This method also prevents a malfunctioning device from being configured. This method is advantageous because it allows configuration of devices that do not have error recovery capabilities in a non-HA mode. Configuration of devices in non-HA mode not only ensures that the system uptime remain unaffected or even improves irrespective of the devices having capabilities to recover from errors, but also, enables speedy resuming from an error. The speedy resuming from error is possible because, in case of occurrence of an error on a link, the device/s configured in non-HA mode may be checked on a priority basis. Since the devices configured in non-HA mode have already been identified for not having capabilities to recover from errors and therefore there is a high probability that one or more of them may have encountered the errors. Checking for devices configured in non-HA mode on priority basis reduces the checking time if an error is occurred in a device configured in the non-HA mode and therefore, reduces efforts/time required for checking all the devices on the link.

Figure 2:
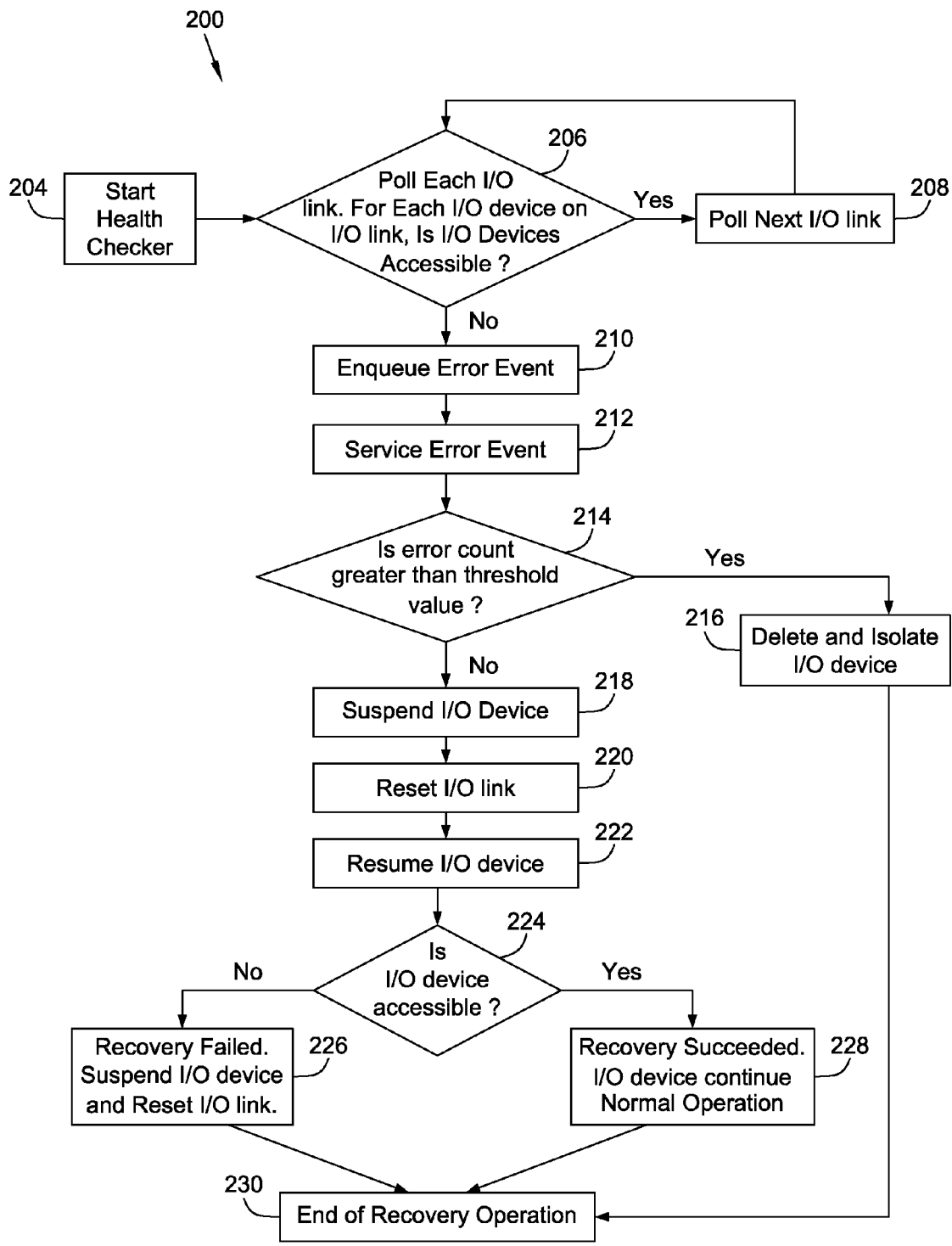
FIG. 2 is a flow diagram a method for handling I/O errors during runtime of a system according to an embodiment of the present subject matter.
Figure 3:
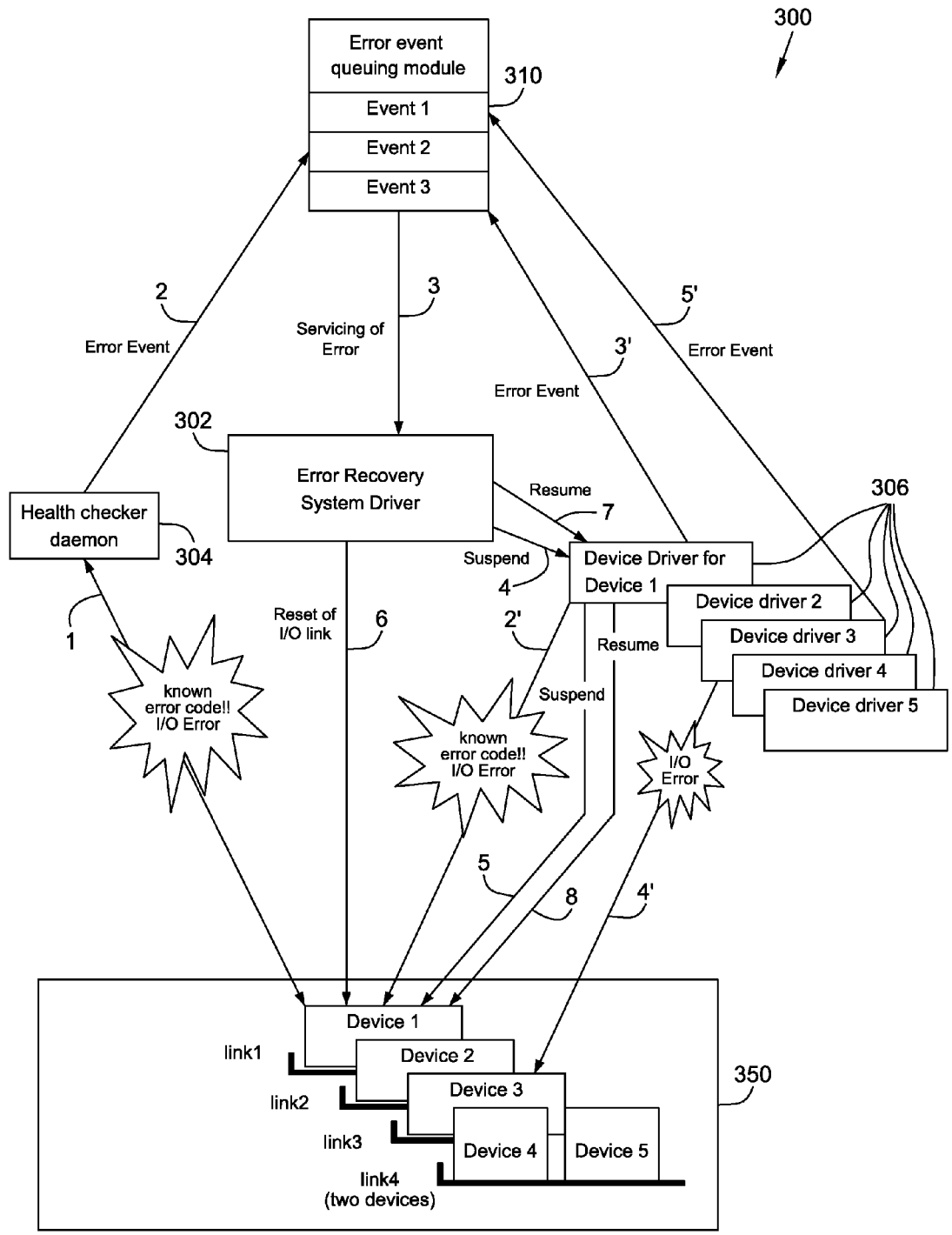
FIG. 3 is a block diagram for implementing a method for handling I/O errors according to an embodiment of the present subject matter.

According to another aspect of the subject matter a method is provided for handling parity I/O errors on a shared link during run time of a system. A block diagram 300 depicting implementation of the method is shown in FIG. 3 and steps 200 followed for implementing the method are shown in FIG. 2. It should be noted that in a reference numeral comprising three digits, the most significant number of the numeral indicates the FIG. number in which the reference numeral may be located. According to the method at step 204 an error recovery system initiates a health checker daemon for checking for I/O errors on a link. The system may initiate the health checker daemon periodically. At step 206 a poll is run to check if all the devices on a link are accessible if so, then next link is selected (step 208) for the poll of step 206. If a device on a link is found to be non-accessible or having errors then at step 210 an error event corresponding to the error of the link is queued. At step 212 a notice is served to the error recovery system notifying that an error event has been encountered. At step 214 it is checked if number of error events queued for a device is more than a value that can be tolerated by the system, if so, then at step 216 the device is isolated and deleted and the recovery operation ends (step 230). Else at step 218 the device is suspended temporarily. At step 220 the I/O link is reset and the device is resumed. In the subsequent step 224 it is checked if the device is accessible, if not, then the device is suspended and the link is reset at step 226. Else at step 228 the device is allowed to function normally. At step 230 the recovery operation ends.

FIG. 3 shows a block diagram of an error recovery module 300 for implementing a method for handling I/O errors according to an embodiment of the present subject matter. The error recovery module 300 has a hardware section 350. The hardware section 350 includes a plurality of devices Device 1, Device 2, Device 3, Device 4 and Device 5. These devices are coupled to a system via a plurality of I/O links link1, link2, link3 and link4. The error recovery module 300 is a software module that has an error recovery system driver 302, health checker daemon 304, an error event queuing module 310 and a plurality of device drivers 306, each device driver 306 corresponds to a device of the hardware section 305. When an error occurs in a device that has a capability to recover, after occurrence of the error all write operations that are intended to be executed on the device are treated as no operations and all the read operations intended to be executed from the device are returned to the system as known error codes. An Operating System (OS) of the system can detect the error by accessing the device driver module 306 using a software module (not shown). The software module may be bundled with the OS. If the software module encounters a known error while reading from the device and it may also list the error event in the error event queuing module 310. The error event queuing module 310 is configured for enlisting all the unhandled errors and for initiating error recovery. Alternatively, the OS can detect the error using health checker daemon 304 (shown in line 5). This health checker daemon is controlled by the OS of the system. The OS may run the health checker daemon periodically, so that, chances of an error remains undetected are minimal. When an error is detected by the health checker daemon 304 or by the OS via device driver 306, the health checker daemon 304/device driver 306 queues the error event in the error event queuing module 310. This is depicted by lines 1, 2 and lines 3', 5' in the FIG. 3. Presence of health checker daemon 304 ensures that I/O errors are detected in a timely manner, and also ensures that I/O errors are detected and corrected even if the OS software modules controlling the I/O devices connected to the I/O link are not able to determine the error. Further, the error event queuing module 310 allows handling of multiple errors without any risk of dropping or bypassing any error. The error event queuing module 310 is also configured for ensuring that an error event is not listed multiple times, this may occur when two different devices report an error event on a link. Dropping of duplicate/multiple error events on the same link allows managing the error handling efficiently by not initiating multiple recovering for the errors occurring on the same link. The error event queuing module 310 also improves the systems' responsiveness by enabling the OS to handle multiple error events at the same time, if the events occur on different I/O links. The error recovery system driver 302 receives one or more error events from the error event queuing module 310. This is depicted by line 3 in FIG. 3. On receipt of an error event the error recovery system driver 302 identifies all devices that are connected to the I/O link. At a first step the system driver 302 brings all the OS modules controlling the I/O devices (i.e., Device Driver Modules) on that link to a common "suspended" mode which is depicted by lines 4 and 5. This makes the device inaccessible to an OS by which the device is being used. This step helps in preventing occurrence of any further new error while the recovery process is in progress. The error recovery system driver 302 then initiates further steps for recovering from the error. A reset operation for the link on which the error has occurred is performed to clear the error or other operation/s may be performed, which operations may be required for making the link functional again. This is depicted by line 6 in the FIG. 3. The error recovery system driver 302 further prepares the line for normal operation by re-initializing and configuring the link. Once the link has been re-initialized, a resume operation of associated device drivers 306 is performed (refer line 7 in the FIG. 3) and this resumes normal functioning of the link.

The error recovery method can also be used for the systems using multiple operating systems as the method includes the step suspending the device for all the operating systems sharing the device and this step of suspending is followed by a recovery operation and resuming the OS modules. Bringing all software modules to a common "suspended" state helps in preventing OS modules from accessing I/O device(s) while the recovery is in progress. This means that the method can be applied to recover I/O devices located in different physical slots but sharing the same I/O link. This aspect of the present subject matter will be discussed in more details with reference to FIGS. 4 and 5.

It should also be noted that, that the system can handle duplicate/multiple error efficiently. This has been depicted in the FIG. 3 using lines numbered with a number and a prime sign (e.g. 3'). When the health checker daemon 304 detected an I/O error (marked as 2'). The error gets queued via line 3'. The error recovery system driver 302 may identify this as a duplicate error if the error on the same link as already been registered in the error event queuing module 310. The error on the same link might have been registered via the health cheker daemon 304 or by some other device accessing the link. Any such duplicate error is dropped; this prevents multiple recovery action for the errors registered for the same link.

Further, the system can handle multiple error events from different sources; this is depicted by the recovery operation for an error detected on a link having Device1 and an error detected by the Device Driver 3 (marked as 4') on a link having Device3. The error detected by the Device Driver 3 is queued on in the error event queuing module 310 via line 5'. Once the error recovery of the Device1 is over, that is, the instructions depicted by line 8 are executed, the error recovery operation for the error event queued in the error event queuing module 310 for the error of the Device 3 is executed.

Above described method may be implemented for I/O devices and device driver modules that support online replacement operation. For online replacement operation the modules may be used for suspending all accesses to a device and initializing the device to resume normal functioning of the system.

According to another aspect to the method, the method may be implemented in a hypervisor environment where multiple operating systems run on a system sharing the I/O resources. In a hypervisor environment, if an I/O link is shared between various I/O software modules running in different OS instances, in order to recover from I/O error on such a link, a synchronization between various I/O software modules in different OS instances sharing the I/O link is required. For such systems the method provides a hypervisor environment, where a common hypervisor module is provided which does the co-ordination of the error recovery steps. The hypervisor module passes the request to perform recovery operation to all I/O software modules running in different OS instances sharing the I/O link and obtains the results of the operation. Once all the I/O software modules complete the required steps for recovering the I/O link (e.g. "suspending" software modules and I/O devices, "resetting" the I/O link and "resuming" the software modules and devices etc.) the hypervisor module enquires the error recovery system driver module in each OS instance to confirm whether I/O device is accessible. Based on the enquiry if the I/O device is accessible, then the error recovery operation is marked as success. The detailed description of the recovery method in a hypervisor environment is explained below in more detail with the reference to FIG. 5. The steps followed for implementing the method is shown in FIG. 4.

Figure 4:
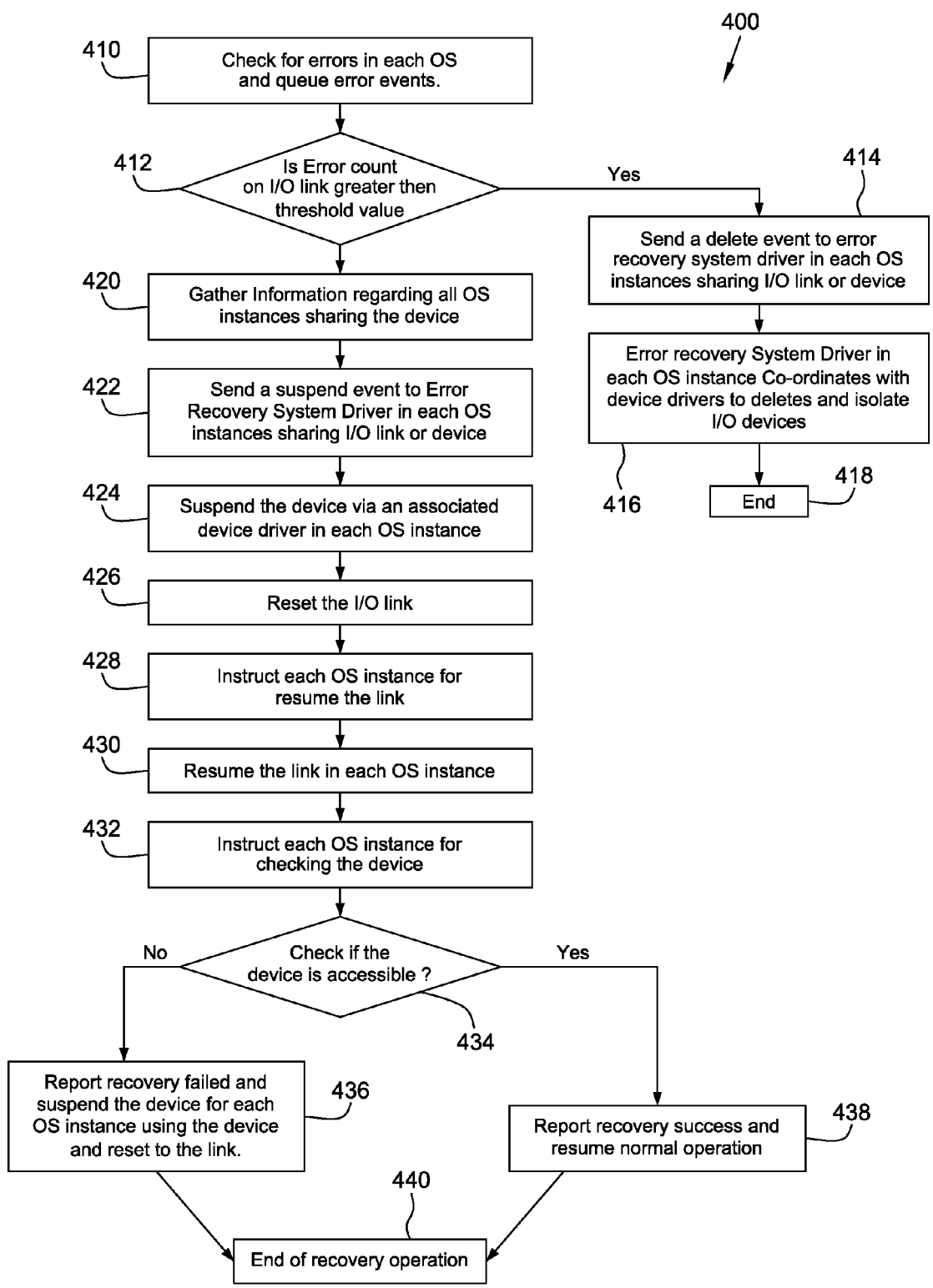
FIG. 4 is an example flow diagram depicting steps followed while implementing a method for handling I/O errors in a hypervisor environment according to present subject matter.

FIG. 4 shows a flow diagram 400 depicting the steps followed while implementing the method in a hypervisor environment. At step 410 a health checker module and device drivers of each OS instance polls their respective I/O links and queues one or more error events—if encountered in respective error event queuing module. At this step a hypervisor module checks the error event queues in each OS instance. At step 412 an error count on a link is checked. Based on the result obtained at step 412, if the error count is greater than a threshold value then the hypervisor module sends delete event to an error recovery system driver of each OS instances sharing the link with the device details. At step 416 error recovery system driver of each OS instance co-ordinates with the device driver to isolate the device. The control is then passed at step 418 to end the recovery process for the device. If the error count is within threshold value then, at step 420 the hypervisor module gathers information about all the OS instances that are sharing the device through the link. At step 422 the hypervisor module sends suspend event to error recovery system driver module of all the OS instances sharing the line with the device. At step 424, the error recovery system driver of each OS instance sends suspend event to device driver module to suspend I/O device controlled by the error recovery system driver. At step 426, the hypervisor module performs a reset operation of the link. At step 428, hypervisor module sends resume event to error recovery system driver module in each OS instance sharing the link with the device. At step 430 error recovery system driver of each OS instance sends resume event to the device driver module to resume the device. The device driver module in each OS instance resumes the device controlled by the driver. At step 432, the hypervisor module enquires the error recovery system driver of each OS instance to check if the device is accessible. At step 434, the error recovery system driver of each OS instance checks for the query of the hypervisor module. If the device is not accessible then at step 436 a recovery failed signal is passed to the hypervisor module by the error recovery system driver of the OS instances that detects that the device is not accessible, and the hypervisor module sends suspend even to error recovery system driver on all OS instances and performs a reset operation for the link. The control is then transferred to indicate completion of error recovery process at step 440. If the device is found accessible by the error recovery system driver/s of each of OS instances then, at step 438, a signal is sent to the hypervisor accordingly and normal function of the device is resumed. The control is then transferred to indicate completion of error recovery process at step 440.

Figure 5:
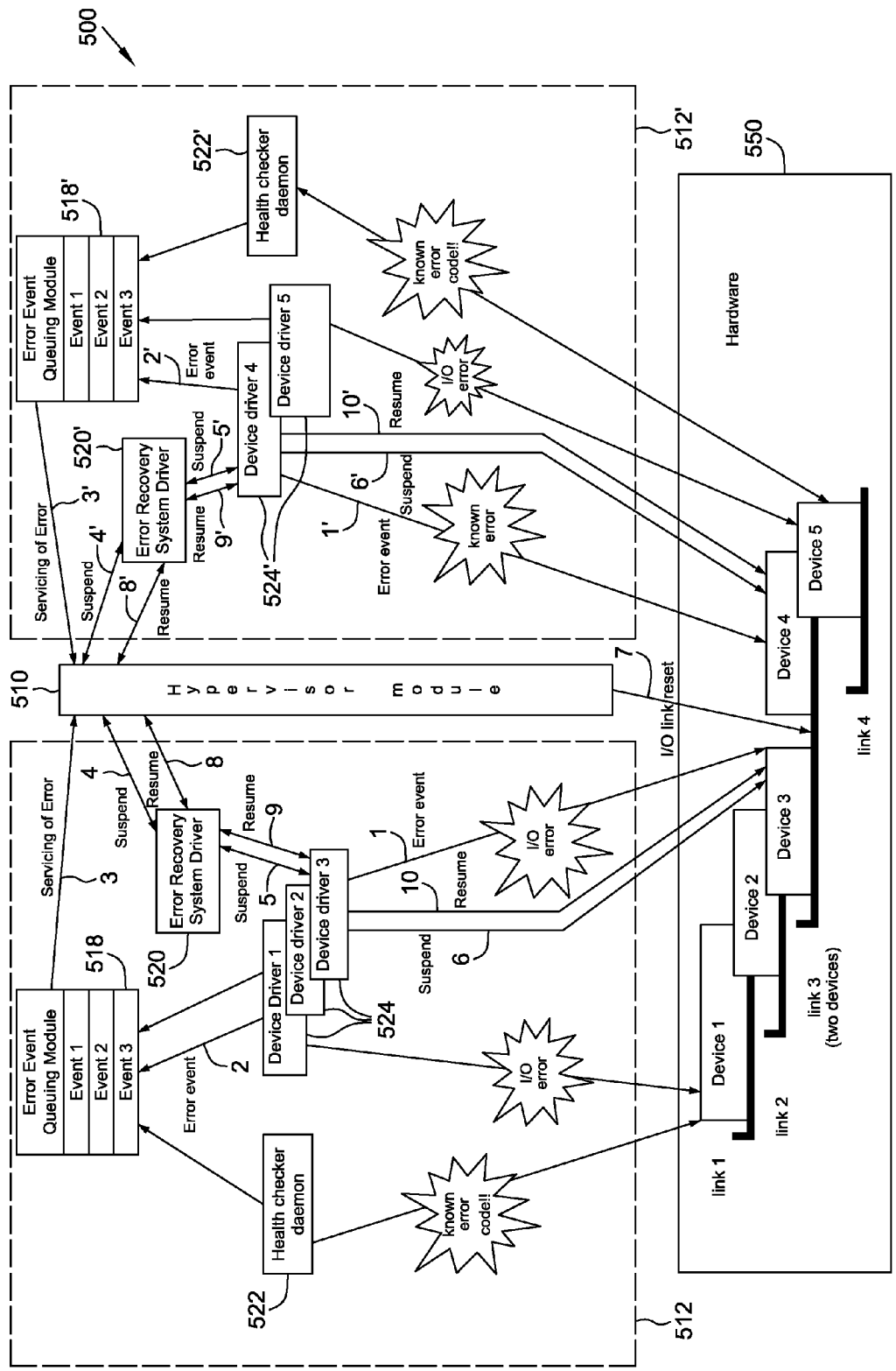
FIG. 5 is a block diagram for implementing a method for handling I/O errors in a hypervisor environment according to an embodiment of the present subject matter.

FIG. 5 shows a block diagram of an example of implementation 500 of the method for a hypervisor environment in more detail. The FIG. 5 depicts two OS instances 512 and 512' however; a person skilled in the art will appreciate that the hypervisor environment depicted in the FIG. 5 can be extended to implement the method for more than two OS instances. The hypervisor environment has a hypervisor module 510 that coordinates between the two OS instances 512 and 512'. Each of the OS instances 512 and 512' respectively has an error event queuing module 518 and 518', an error recovery system driver 520 and 520', health checker daemon 522 and 522' and device drivers 524 and 524'. Both the OS instances 512 and 512' share a hardware module 550. The hardware 550 includes Device 1, Device2, Device 3, Device 4 and Device 5. The Device 1 and Device 2 are coupled to link 1 and link 2, respectively. The Device 3 and Device 4 are coupled to link 3 and the Device 5 is coupled to link 4. The implementation of the method will be explained in more detail in what follows below.

The following explanation of the implementation of the technique largely refers to the link3 which is shared between the two OS instances 512 and 512'. The link 3 has two devices namely: Device 3 controlled by device driver 3 of 524 in OS instance 512; and Device 4 controlled by device driver 4 of 524' in OS instance 512'.

The Health checker daemon 522 and 522' of each OS instance 512 and 512' periodically checks for I/O error condition on all I/O links as part of respective OS instance. Each of the device driver modules 524 and 524' controlling corresponding devices also can detect I/O error condition during its normal functioning. The diagram depicts a situation where the device driver 3 of OS instance 512 encounters an error code while accessing the link 3. This stage is marked as 1 in FIG. 5 and the device driver 4 of 524' of OS instance 512' encounters an error while accessing Device 4 on the same shared link (Marked as 1' in the FIG. 5).

The device driver 3 of 524 in OS instance 512 queues an error event to the Error event queuing module 518 (Marked as 2) and device driver 4 of 524' of OS instance 512' queues an error event in the error event queuing module 518' (Marked as 2'). The hypervisor module 510 checks the error event queuing module 518 and 518' of each of the OS instance 512 and 512' for any error that might have been listed in the respective error event queuing modules 518 and 518'. If the hypervisor module 510 determines that one or more errors are listed in the error event queuing module 518 then the hypervisor module 510 is served the error event (marked as 3 and 3'). On receiving an error event from the error event queuing module 518/518' the hypervisor module 510 determine details regarding the OS instances that are sharing the link on which the error has been encountered. Upon finding the all OS instances, the hypervisor module 510 sends a suspend event to the error recovery system driver 520 and 520' of each the OS instances sharing the link with the device information (Marked as 4 and 4'). Each of the error recovery system drivers 520 and 520' of each of the OS instance 512 and 512' send the suspend event to respective controlling device drivers of 524 and 524' in corresponding OS instance to suspend the device/s (Marked as 5 and 5'). The device drivers 524 and 524' of each OS instance 512 and 512' (in this example device driver 3 of OS instance 512 and device driver 4 of OS instance 512') suspend corresponding devices (Device 4 and Device 3) controlled by them (marked as 6 and 6'). This step ensures that all the OS instances in using the shared links and devices find the malfunctioning link/devices in a common suspended mode and no access is made to that link by any of the OS instances. The hypervisor module 510 then follows steps for error recovery by performing a reset of the link on which the error occurred or by performing other operations that might be required to perform for making the link functional again (Marked as 7). Once the link is successfully reset, the hypervisor module 510 issues instruction to resume normal operation of the suspended device to the corresponding error recovery system drivers 520 and 520' (Marked as 8 and 8'). The error recovery system drivers 520 and 520' of each OS instance sends resume event to device drivers 524 and 524' to resume the device (Marked as 9 and 9'). The device drivers 524 and 524' of each OS instance resumes device controlled by it. This step may involve re-initialization of the device and preparing the device for normal operation (Marked as 10 and 10').

According to another aspect of the method, the method provides error recovery system drivers (520 and 520') that supports a mechanism to ensure that the recovery process does not result in an infinite loop (due to repeated errors in the recovery process). At the end of the recovery process, the error recovery system drivers (520 and 520') verifies the state of the I/O link. If the I/O link is in an error state, indicating that the recovery operation has not succeeded, the error recovery system drivers (520 and 520') suspend all the Device Drivers (524 and 524') controlling I/O devices on that link. According to an aspect, if the I/O link is in such a state, where automatic recovery has failed, then the I/O link may be recovered using a manual recovery process, which is very much similar to the Online Replacement (OLR) functionality for I/O devices. In the manual recovery process, the user is provided the option to replace the malfunctioning I/O device with a properly functioning I/O device and restart the I/O device without having to reboot the system.

Another aspect of the method enables a user of a particular I/O device to specify a threshold value for the maximum number of repeated I/O errors in a specified time interval, before stopping the recovery process. According to a further aspect of the method/system is capable of determining a threshold value or setting a default threshold value. According to yet a further aspect, software is provided with a mechanism that checks for each device, if the number of repeated I/O errors in a specified time intervals are within the threshold value. In case the number exceeds the threshold value then the software initiates a deleting process for the device. Such devices are specially tagged and are isolated on all further system reboots thereby eliminating the possibility of any further generation of I/O errors from that I/O device. A user can use Online Addition (OLA) operation to add the device to the system configuration, after replacing the malfunctioning device with a properly functioning device to the system.

Although the flowcharts shown in FIGS. 1, 2, and 4 include steps, that are arranged substantially serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

The discussion further provides a computer system that is capable of executing the method described with reference to FIGS. 1, 2 and 5. The discussion further provides a computer readable medium that comprises instruction, the instruction when executed with a computer system implements the method described with reference to FIGS. 1, 2, and 5. The discussion further provides an article that includes the computer readable medium.

According a method and system for handling errors on an Input/Output (I/O) link of a system is provided. The link is being shared by a plurality of devices of the system. The method supports handling of error on a system having plurality of operating systems. The method of error handling during configure of the system includes steps of checking a device for an error during configuration of the system and suspending the device from being configured, if an error is detected. The method also includes the step of examining the device capabilities to recover from errors, and; configuring the device in a first mode if the device has capabilities to recover from errors, else configuring the device in a second more or not configuring the device. Further, the handling of error may also be performed during runtime of the system, for doing so the step of checking is followed by a step of isolating and deleting the device if value of a number indicative of errors encountered for the device is greater than a threshold value. Else the method provide step of initiating a recovery process for the device and reporting result of recovery process.

The above technique can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1-5 are merely representational and are not drawn to scale. Certain proportions thereof may be exaggerated, while others may be minimized. FIGS. 1-5 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus, the following claims are hereby incorporated into the detailed description of the embodiments of the invention, with each claim standing on its own as a separate preferred embodiment.

The invention claimed is:

1. A method for handling parity errors in an Input/Output (I/O) link of a system, the link being shared by a plurality of devices of the system, the method comprising the steps of:
    checking a device for one or more errors during configuration of the system;
    restricting the device from being configured and repeating the step of checking for another device, if one or more errors are detected;
    examining the device for capabilities to recover from errors; and
    configuring the device in a first mode if the device has the capabilities to recover from the errors.

2. The method as claimed in claim 1, further comprising:
    configuring the device in a second mode according to an uptime priority of the system, if the step of examining determines that the device does not have capabilities to recover from errors.

3. The method as claimed in claim 1 wherein, the step of examining the device includes the step of validating a software code of the device, the software code being a code that drives operation of the device.

4. The method as claimed in claim 1 wherein, the step of configuring device includes step of supplying an identifier to the device, the identifier being configured to indicate mode of configuration.

5. The method as claimed in claim 2 wherein, the step of configuring device includes step of supplying an identifier to the device, the identifier being configured to indicate mode of configuration.

6. A method for handling parity errors on an Input/Output (I/O) link of a system, the link being shared by a plurality of devices of the system, the method comprising the steps of:
checking a device for an error during run time of the system;
isolating and deleting the device if value of a number indicative of errors encountered for the device is greater than a threshold value and repeating the step of checking for another device;
initiating a recovery process for the device; and
reporting result of recovery process.

7. The method as claimed in claim 6, wherein the step of initiating a recovery process comprises the steps of:
suspending one or more devices coupled to the link;
resetting a link to which the device is coupled; and resuming one or more devices coupled to the link.

8. The method as claimed in claim 6, wherein the system includes a plurality of operating systems and the step of isolating and deleting the device comprises the steps of:
gathering details of the operating systems sharing the device; and
coordinating and updating each of the operating system that uses the device, while isolating and deleting the device.

9. The method as claimed in claim 8 wherein, the step of initiating the recovery process comprises:
gathering details of the operating systems sharing the device; and
coordinating and updating each of the operating system that uses the device, while performing recovery process.

10. The method as claimed in claim 6 wherein, the step of checking comprises:
listing the error in a error event queuing module; and
counting the number according to the listed errors.

11. The method as claimed in claim 8, wherein the step of coordinating and updating is performed by a hypervisor.

12. The method as claimed in claim 9, wherein the step of coordinating and updating is performed by a hypervisor.

13. The method as claimed in claim 6, wherein the step of checking is performed periodically by a health checker daemon.

14. The method as claimed in claim 6, wherein the step of checking is performed using a device driver of the device.

15. A computer system comprising:
a processing unit; and
a memory coupled to the processing unit, the memory having stored therein a code for handling parity errors on an Input/Output (I/O) link of a system, the code causes the processor to perform a method for handling parity errors on an I/O link of a system, the link being shared by a plurality of devices of the system, comprising the steps of:
checking a device for an error during configuration of the system;
restricting the device from being configured and repeating the step of checking for another device, if an error is detected;
examining the device capabilities to recover from errors; and
configuring the device in a first mode if the device has capabilities to recover from errors.

16. A computer system comprising:
a processing unit; and
a memory coupled to the processing unit, the memory having stored therein a code for handling parity errors on an Input/Output (I/O) link of a system, the code causes the processor to perform a method for handling parity errors on an I/O link of a system, the link being shared by a plurality of devices of the system, comprising the steps of:
checking a device for an error during run time of the system;
isolating and deleting the device if value of a number indicative of errors encountered for the device is greater than a threshold value and repeating the step of checking for another device;
initiating a recovery process for the device; and
reporting result of recovery process.

17. The computer system as claimed in claim 16, wherein the system is configured for handling a plurality of operating system.

18. A computer-readable storage medium operable with a computer system, the computer-readable medium having stored thereon instructions operable with an architectural simulator environment supported by the computer system, the medium comprising:
instructions for handling parity errors on an Input/Output (I/O) link of a system, the link being shared by a plurality of devices of the system, the instructions are configured to execute a method, the method comprising the steps of:
checking a device for an error during configuration of the system;
restricting the device from being configured and repeating the step of checking for another device, if an error is detected;
examining the device capabilities to recover from errors; and
configuring the device in a first mode if the device has capabilities to recover from errors.

19. An article comprising the computer readable storage medium of claim 18.

20. A computer readable storage medium operable with a computer system, the computer-readable medium having stored thereon instructions operable with an architectural simulator environment supported by the computer system, the medium comprising:
instructions for handling parity errors on an Input/Output (I/O) link of a system, the link being shared by a plurality of devices of the system, the instructions are configured to execute a method, the method comprising the steps of:
checking a device for an error during run time of the system;
isolating and deleting the device if value of a number indicative of errors encountered for the device is greater than a threshold value and repeating the step of checking for another device;
initiating a recovery process for the device; and
reporting result of recovery process.

21. An article comprising the computer readable storage medium of claim 20.

* * * * *

UNITED STATES PATENT AND TRADEMARK OFFICE
CERTIFICATE OF CORRECTION

PATENT NO. : 7,620,854 B2
APPLICATION NO. : 11/668489
DATED : November 17, 2009
INVENTOR(S) : Harish Kuttan et al.

It is certified that error appears in the above-identified patent and that said Letters Patent is hereby corrected as shown below:

In column 9, line 27, in Claim 8, delete "of;" and insert -- of: --, therefor.

Signed and Sealed this

Sixteenth Day of February, 2010

David J. Kappos
*Director of the United States Patent and Trademark Office*